Feb. 24, 1970  R. H. DREISBACH ET AL  3,497,393
SEA-WATER ACTIVATED BATTERY
Filed Aug. 3, 1967
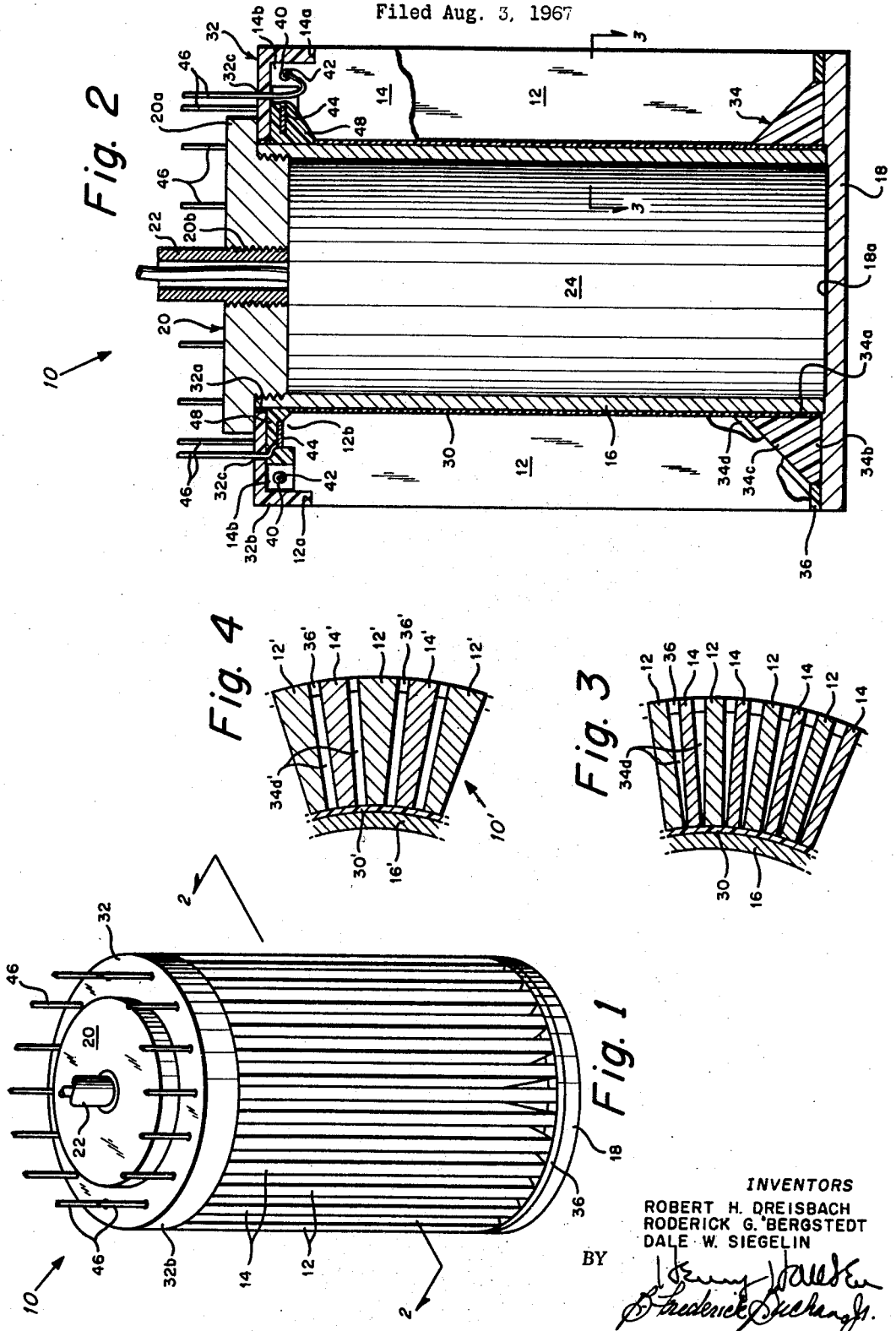
INVENTORS
ROBERT H. DREISBACH
RODERICK G. BERGSTEDT
DALE W. SIEGELIN
BY
ATTORNEYS

United States Patent Office

3,497,393
Patented Feb. 24, 1970

3,497,393
SEA WATER ACTIVATED BATTERY
Robert H. Dreisbach, Roderick G. Bergstedt, and Dale W. Siegelin, Fort Wayne, Ind., assignors, by mesne assignments, to the United States of America as represented by the Secretary of the Navy
Filed Aug. 3, 1967, Ser. No. 658,288
Int. Cl. H01m *17/00*
U.S. Cl. 136—100    3 Claims

ABSTRACT OF THE DISCLOSURE

A single cell, sea water activated battery having a plurality of alternately sequenced anodic and cathodic plates each positioned to extend radially outwardly of a central core, the plates being made of magnesium and of silver chloride.

BACKGROUND OF INVENTION

A need has existed for a battery which is operable in a sea water environment and is suitable for supplying electronic components with sufficient power for varying loads to sustain operation thereof over a relatively long life in excess of two months. Known sea water activated batteries have been unsuitable for such a purpose in that they have been characterized by some or all of the following deficiencies: leakage currents of a magnitude which renders long-life operation unattainable; accumulation of reaction products which adversely affect the capability of the battery to provide substantially the same voltage and power under varying load conditions; a high internal resistance which adversely affects the power capability of such batteries; and easily subjected to harmful corrosion.

SUMMARY OF INVENTION

It is the general purpose of this invention to provide a battery which has a long-life operation and which overcomes the deficiencies of the prior art. An object of the invention is to provide a battery which has a low leakage current and a low internal resistance and which is capable of providing a relatively constant voltage output over its long life. Another object of the invention is to provide a battery wherein the reaction components produced during operation thereof do not interfere with its continuing operation. Yet another object of the invention is to provide a sea water activated battery wherein corrosion of nearby metal parts is reduced. Still another object of the invention is to provide a compact sea water activated battery including an internal volume suitable for receiving electronic components which can be connected to utilize the battery as a power supply.

The general purpose, the above indicated objects, and other objects which will become apparent from the specification and accompanying drawing may briefly be accomplished by providing a single cell battery having a plurality of alternately sequenced, anodic and cathodic electrode plates extending radially of a core member, alternate plates being connected together to form the anode and intervening plates being connected together to form the cathode.

BRIEF DESCRIPTION OF THE DRAWING

FIG. 1 represents a pictorial view of a battery according to the invention;
FIG. 2 represents a cross-sectional view in elevation of the battery taken substantially along line 2—2 of FIG. 1, portions thereof being broken away;
FIG. 3 represents a cross-sectional view in plan of a portion of the battery of FIG. 1 taken along line 3—3 of FIG. 2; and
FIG. 4 represents a cross-sectional view in plan of a portion of a modified form of the battery taken substantially in the same direction as is FIG. 3.

DESCRIPTION OF PREFERRED EMBODIMENTS

Referring to FIGS. 1 and 2, the battery 10 includes a plurality of alternately spaced cathodic plates and anodic plates 12 and 14, each of which plates extends radially from and has a lateral edge fixed to an insulated tube 16 of circular cross-section. The cathodic plates 12 are made of silver chloride, and the anodic plates 14 are made of magnesium. Of course, it is contemplated that the anodic and cathodic plates may be fabricated from other materials which are well known in the art and which, in the electrolyte such as salt water, are capable of developing a voltage therebetween.

More particularly, referring to FIG. 2, the battery 10 includes a circular base plate 18 having a coaxially aligned, circular recess 18a of a size to receive an end of the tube 16 which is fixed thereto. The inner periphery of the other end of the tube 16 is threaded to receive a circular cap 20 having a radially extending flange 20a which projects outwardly of the tube 16 and having a coaxially aligned, threaded aperture 20b within which is received a cable connector 22. The tube 16, the base plate 18, and the cap 20, all of which may be made of aluminum, define a core member having a liquid tight chamber within which may be packaged a canister 24 of electronic components. For example, it may be desirable to include within the canister 24 a D.C.–D.C. converter for stepping up the voltage developed by the battery 10. The lateral surface of the aluminum tube 16 has been black anodized and then covered with an insulating material 30 such as the polyester film "Mylar" made by Du Pont and Co.

The anodic and cathodic plates 14 and 12 are fixed to the core member in spaced relation to each other and clamped in position between an insulating cap washer 32 and an insulating plate divider 34. The cap washer 32 is of a generally circular configuration and has extending therethrough a coaxial aperture 32a of a size to receive therewithin the threaded end portion of the tube 16. The cap washer 32 also has a peripherally located, depending wall portion 32b which is arranged to extend toward the base plate 18. The divider 34 has an axial bore 34a within which is received the tube 16, has a cylindrical portion 34b which abuts and extends from the base plate 18, and has a truncated conical portion 34c, whose surface diverges inwardly at an angle of about 45° toward the lateral periphery of the tube 16. The divider 34 further has a plurality of spaced apart ridges 34d which project longitudinally of the conical portion 34c and generally extend obliquely to and radially of the tube 16. The adjacent lateral surfaces of successive ridges 34d are parallel and collectively define a plurality of electrode plate receiving grooves. The outermost ends of the ridges 34d extend outwardly of the cylindrical portion 34b and define, together with the portion 34b and the base plate 18, an annular aperture within which is received an insulating base washer 36. The washers 32 and 36 and the divider 34 function to mechanically clamp and support the anodic and cathodic plates 14 and 12 in spaced relation and are made of a material which has structural strength and good insulating properties such as a linen base phenolic which electrically insulates the plates 12 and 14 from the cap 20 and plate 18.

The anodic and cathodic plates 14 and 12, which are of generally rectangular configuration and cross section, each have one end which is shaped to be received within the grooves of the divider 34 and abut the adjacent surfaces both of the conical portion 34c and of the tube 16. The other ends of the plates 12 and 14 each include formed therein at the outer corners thereof a rectangular recess 12a or 14a having a depth and a thickness sufficient to slidingly receive the depending wall portion 32b of the insulating cap washer 32. Each of the plates 12 and 14 is firmly secured at its edges to the abutting surfaces of the insulated tube 16, the divider 34, the wall portion 32b of the cap washer 32 and the base washer 36 by a water-insoluble, epoxy resin. The establishment of a firm bond of the magnesium plates 14 by use of the resin is enhanced by treating the abutting plate edges with the HAE process.

The other end of each of the anodic plates 14 also terminates in an apertured tab 14b which extends longitudinally adjacent the rectangular recess 14a thereof and the wall 32b and is of a length to abut the inwardly facing surface of the insulating cap washer 32. Since soldering directly to magnesium is undesirable, conductor-receiving metallic eyelets 40, with spring lock washers under the eyelet heads, are fixed in position with the bodies of the eyelets within the apertures of the tabs 14b. A conductor ring of copper 42, only partially shown, is threaded through and soldered to each of the eyelets 40.

The cap adjacent ends of the cathodic plates 12 similarly terminate in tabs 12b which are positioned adjacent the periphery of the tube 16 in spaced relation to the adjacent surfaces of the cap washer 32 and the tube 16 and in radially spaced relation to the inner edges of the tabs 14b. Electrical interconnection of each of the silver chloride plates 12 is established through a copper washer 44 which is soldered to the ends of each of the tabs 12b and is spaced from the tube 16, the cap washer 32 and the tabs 14b of the anodic plates 14.

The insulating cap washer 32 includes a circular arrangement of symmetrically positioned apertures 32c extending therethrough adjacent the annular space defined between the tabs 12b and 14b. It has been found convenient to extend therethrough insulated electrical conductors, such as 46, the alternate conductors each having an end electrically secured to the adjacent portion of the conducting ring 44 and the intervening conductors each having an end electrically secured to adjacent portion of the conductor 42 which is threaded through and electrically connected with each of the eyelets 40 of the anodic plates 14. The symmetrical configurations of the electrical connections of the conductors 46 with the conducting rings 42 and 44 substantially insure that the plates 12 and 14 will be equally loaded. In order to protect the conductors 46, the conductor ring 42, the eyelets 40 and the copper washer 44 from corrosion, the volume between the plates 12 and 14 and within the cap 32 and its depending wall portion 32b is filled with epoxy resin 48 which adds structural strength to the battery 10 and maintains the spaced relation of the plates 12 and 14.

As shown in FIG. 3, there is a substantially wedge-shaped space defined between each of the cathodic and anodic plates 12 and 14 intermediate the ends thereof. During operation of the battery 10 in a sea water environment these spaces are exposed to and are filled with the sea water electrolyte which additionally functions to flush out and disperse reaction components which appear between the electrode plates as the battery 10 is used.

In order to conserve the amount of silver chloride material used in the manufacturing of the battery and to maintain as low an internal electrical resistance as possible during the expected active life of the battery, it is desired that the plate thickness be chosen such that at the end of the desired life period, the silver chloride cathodic plates 12 are completely used up, or nearly so, before the magnesium anodic plates 14. The relative thicknesses of the electrode plates 12 and 14 may be determined in accordance with the equation defining the relative rates of decomposition of the plate materials used and generally a slightly greater amount of the anodic magnesium material is used to ensure that it will not be depleted prior to the cathodic silver chloride material. In the embodiment described, this condition was attained even though the cathodic plates 12 of silver chloride are somewhat thicker than are the anodic plates 14 of magnesium.

Referring to FIG. 4, a modified form of battery 10' includes anodic and cathodic plates 14' and 12' having cross sections shaped like isosceles trapezoids so that the adjacent lateral surfaces of successive plates 12' and 14' are parallel. A battery having these wedge-like electrode plates 12' and 14' and having the same external dimensions as the battery of FIG. 3 has a longer life in that more silver chloride and magnesium is included in the same external configuration. The spacing between the plates 12' and 14' is sufficient to allow a free flow of the electrolyte therebetween in order that the decomposition products produced during operation of the battery may be flushed out and dispersed and yet close enough for a low internal resistance.

From the above, the invention provides an improved sea water activated battery having a longer life and a lower internal impedance than do sea water activated batteries heretofore known. This is, in part, attributable to the close spacing between the adjacent surfaces of the plates 12 and 14. For example, a battery 10 according to the invention having a tube 16 of a 4¼ inch diameter and eighty electrode plates 12 and 14 of dimensions approximately 9⅛ inches long and 1¼ inches wide wherein the anodic plates 14 were 0.125 inch thick, the cathodic plates 12 were 0.180 inch thick and the spacing between adjacent plates varied radially from ⅛ to ⅝ inch, was found to have a capacity in excess of 900 ampere hours over a test life of two months. Such a battery provided measured output voltages of 1.51 volts to 1.57 volts at a low load and 1.2 volts to 1.5 volts at a high load. A suitable D.C. to D.C. converter for stepping up the voltage of the single cell battery 10 is one of the saturable core type converters which is designed for high efficiency. Further in accordance with the objects of the invention, the longer life battery according to the invention has a low leakage current and is of a construction to permit the continuing removal of reaction components which may otherwise adversely affect its capability. Additionally, since the electrode plates are closely spaced, the lateral periphery of the battery 10 is, in the aggregate, relatively neutral whereby corrosion of the adjacent metal parts is reduced.

It should be understood, of course, that the foregoing disclosure relates only to preferred embodiments of the invention and that numerous modifications or alterations may be made without departing from the spirit and scope of the invention as set forth in the appended claims.

What is claimed is:
1. A battery comprising:
   a cylindrical core member having an axis;
   a first plurality of spaced-apart anodic electrode plates of trapezoidal cross section encircling said core member, each said plate extending radially of and aligned longitudinally with said core member and having an edge defining the smaller trapezoidal base connected to said core member; and
   a second plurality of spaced-apart cathodic electrode plates of trapezoidal cross section encircling said core member, each sad cathodic plate being positioned in spaced relation between successive anodic plates, extending radially of and aligned longitudinally with said core member and having an edge defining the smaller trapezoidal base connected to said core member, the opposed lateral surfaces of adjacent said anodic and cathodic plates being parallel.

2. A sea water activated, single-cell battery immersible in an electrolyte of sea water comprising:
- a cylindrical core member having a longitudinal axis and having an electrically insulating periphery;
- a plurality of anodic electrode plates of trapezoidal cross-sectional configurations and being positioned in spaced relation about said core member in a core-encircling arrangement, each said anodic plate having an inner edge extending parallel to said axis and contiguously connected to said core member periphery and an outer edge radially displaced therefrom;
- a like plurality of cathodic electrode plates of trapezoidal cross-sectional configurations and being positioned in spaced relation about said core member in a core-encircling arrangement, each said cathodic plate being interspersed in spaced relation to and between a respective pair of anodic plates and each having its lateral surfaces confronting those of the adjacent anodic plates in parallel spaced relation allowing the flow of sea water therebetween, each said cathodic plate having an inner edge extending parallel to said axis and contiguously connected to said core member periphery and an outer edge radially displaced therefrom;
- said anodic and cathodic plates being made from respective materials capable of developing a voltage therebetween in the presence of sea water;
- first conductor means electrically connecting each of said anodic plates in parallel;
- second conductor means electrically connecting each of said cathodic plates in parallel; and
- said confronting lateral surfaces and said outer edges of each of said anodic and cathodic plates being exposed for immersion in sea water.

3. A battery according to claim 2 wherein: said anodic and cathodic plates have isosceles trapezoidal cross-sectional configurations.

References Cited

UNITED STATES PATENTS

| | | | |
|---|---|---|---|
| 2,898,394 | 8/1959 | Williams | 136—90 |
| 2,979,552 | 4/1961 | Kuck | 136—90 |
| 3,022,365 | 2/1962 | Saurwein | 136—90 |
| 3,052,744 | 4/1962 | Henry | 136—90 |
| 3,169,084 | 2/1965 | Sommerman et al. | 136—90 |
| 3,174,878 | 3/1965 | Peters | 136—6 |
| 3,369,936 | 2/1968 | Noll | 136—6 |

WINSTON A. DOUGLAS, Primary Examiner

C. F. LEFEVOUR, Assistant Examiner

U.S. Cl. X.R.

136—90